July 8, 1969  M. E. HOLMGREN  3,454,695
METHOD OF FORMING COILED PLASTIC HOSE
Filed March 30, 1967  Sheet 3 of 3
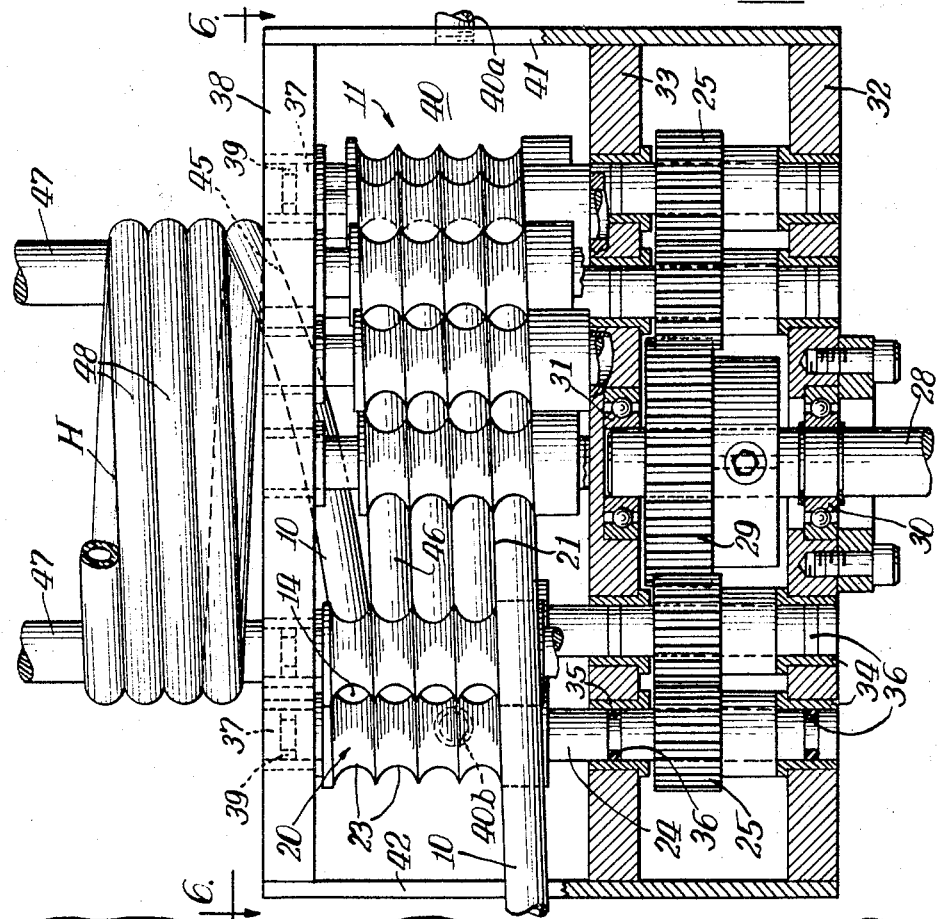
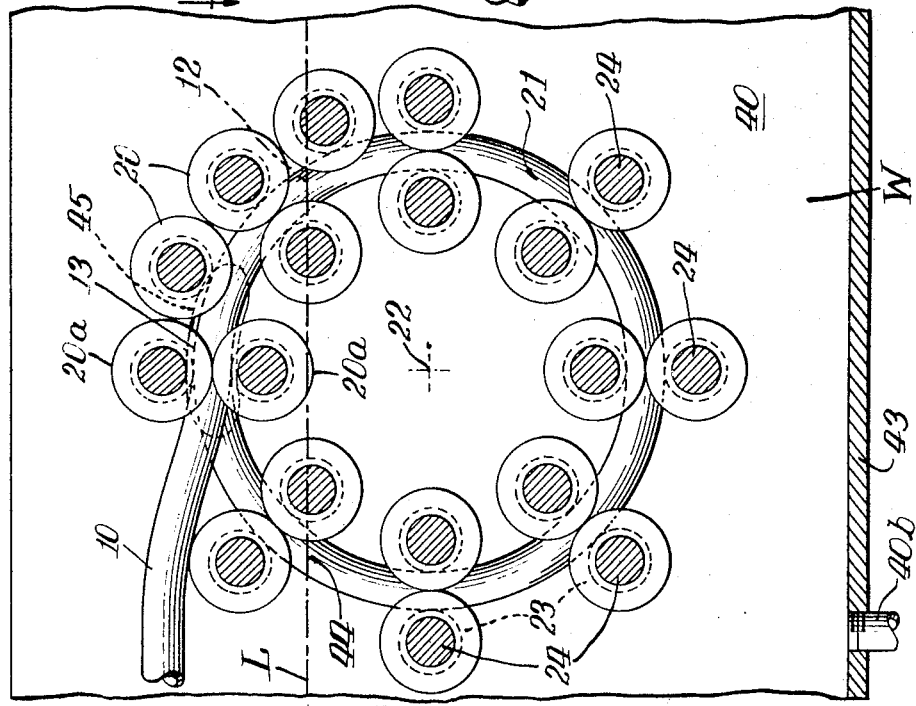

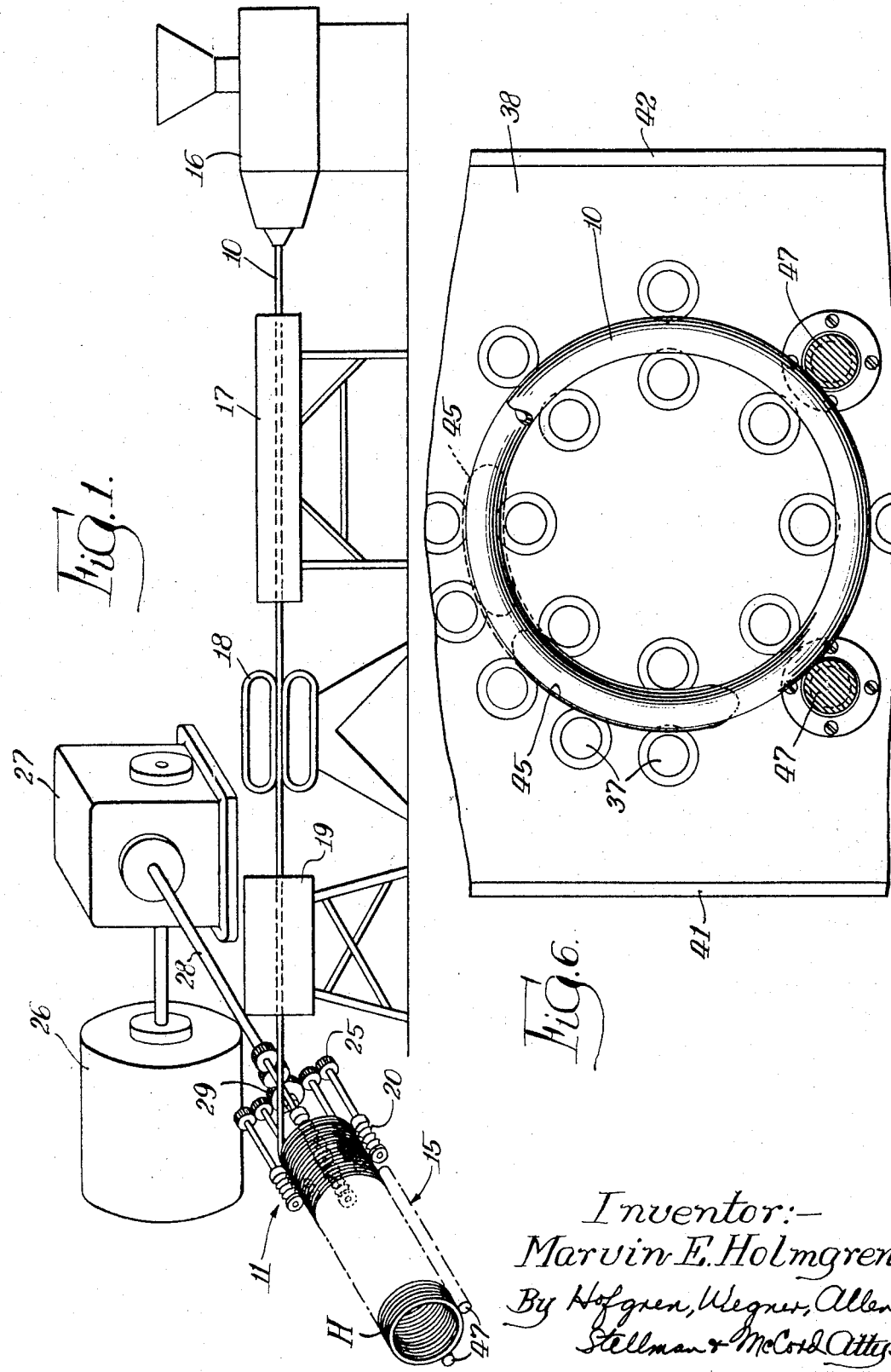

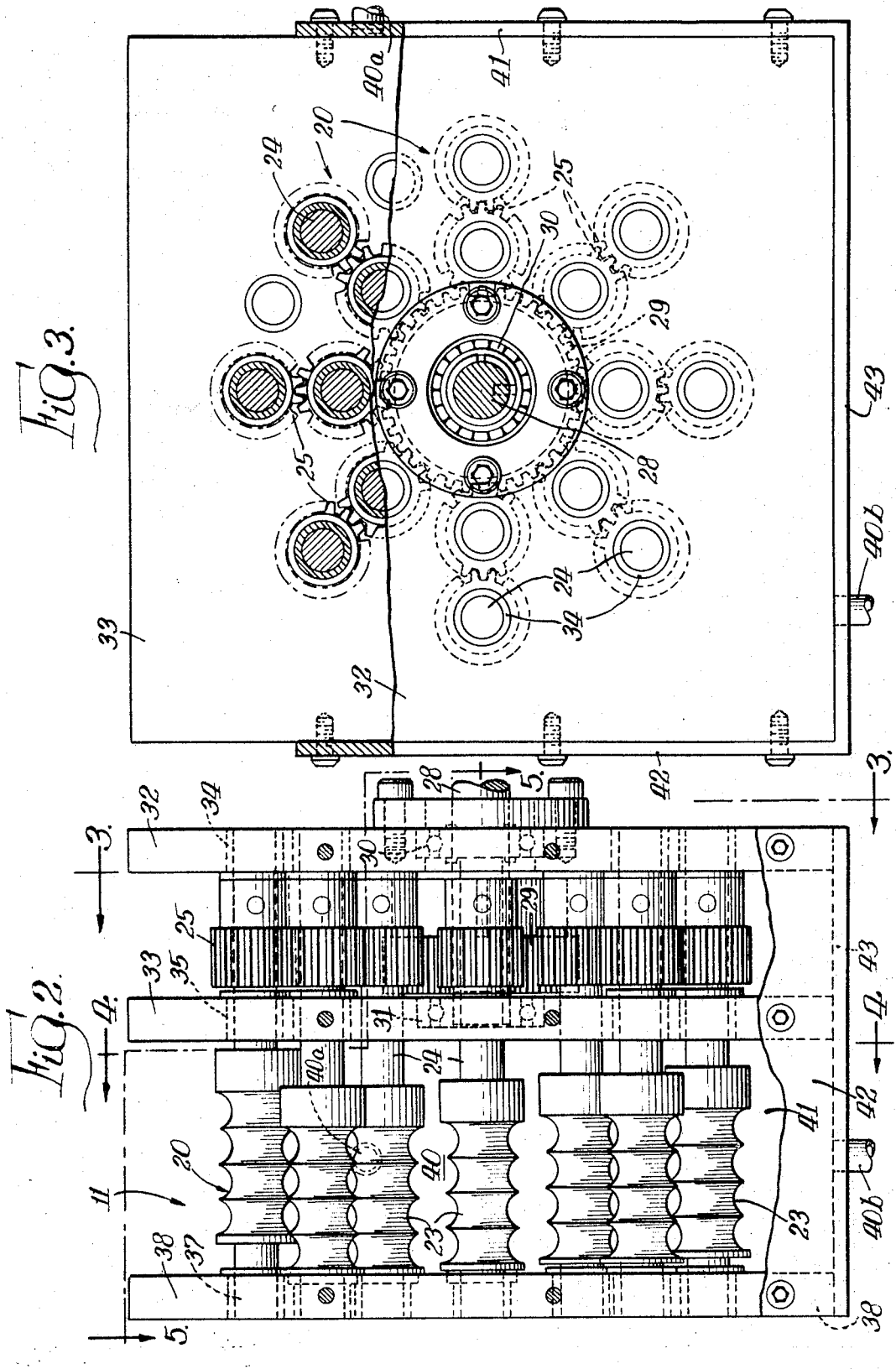

3,454,695
METHOD OF FORMING COILED PLASTIC HOSE
Marvin E. Holmgren, Manitowoc, Wis., assignor to Imperial-Eastman Corporation, a corporation of Illinois
Filed Mar. 30, 1967, Ser. No. 627,261
Int. Cl. B29d 23/04; D01d 5/24
U.S. Cl. 264—209     10 Claims

ABSTRACT OF THE DISCLOSURE

A method of forming coiled plastic hose wherein a plastic tube is guided into a helical path while at a deformable temperature and subsequently cooled while in said path to maintain the tube in the helical configuration.

---

This invention relates to plastic hose and in particular to the continuous forming of coiled plastic hose.

In one conventional method of forming plastic hose, the thermoplastic tube is raised to a deformable temperature by means of circulating a warm fluid through the tube while bending the tube to the desired helical configuration. The fluid may comprise air, water vapor, hydraulic oil, etc. The bending of the tube may be effected by placing the tube on a cold form while in the warm condition, the setting of the tube in the helical configuration may then be effected by cooling the plastic material such as by circulating cold fluid therethrough. This process has had the serious disadvantages of requiring substantially complete support of the tube along the entire helical length thus requiring a rather complicated form. Another problem arising in the use of a fluid such as oil is the necessity of removing the oil completely from the interior of the tube. The tube further tended to dilate against the form, and where a number of bends were effected simultaneously on the same length of tube, it was found necessary to remove the tube from the form prior to the final cooling thereof to eliminate stresses and deformations therein caused by retracting of the material. Another method of forming such helical coiled plastic hose is to apply the cold plastic tube to a metal mold which is suitably heated. As the bending of the plastic tube takes place, the interior fibers become gradually heated thus permitting the tube to be progressively coiled about the form. Once the coiling process is completed, the tube may be left on the warm mold for a short period of time, and then removed and placed on a suitable template to obtain the specific shape desired. The coiled hose is then set by cooling the hose in the coiled configuration as by immersion of the coiled hose in cool water.

Each of these known methods has the serious disadvantage of relatively complicated manufacture and difficulty of completely eliminating the stresses in the plastic in the helical formation of the hose. The present invention comprehends an improved method of continuously forming the coiled plastic hose which eliminates the disadvantages of the above discussed known methods in a novel and simple manner.

Thus, a principal feature of the present invention is the provision of a new and improved method of forming coiled plastic hose.

Another feature of the invention is the provision of such a method of continuously forming such coiled plastic hose.

A further feature of the invention is the provision of such a method of continuously forming coiled plastic hose comprising the steps of continuously feeding a plastic tube axially to a forming zone, causing the temperature of the tube to be at least the annealing temperature thereof, guiding the tube in a helical path in the forming zone, cooling the tube in the guided helical path commencing at a first point spaced from the beginning of the helical path sufficiently to cause the tube to have a helical configuration prior to cooling thereof, and continuing to a second point whereat the tube is cooled sufficiently to become set in the helical configuration, and supporting the set hose in a coiled helical configuration for at least a preselected time to complete the forming.

A yet further feature of the invention is the provision of such a method wherein the point at which the cooling is initiated is spaced angularly from the beginning of the helical path at least approximately 45°.

Another feature of the invention is the provision of such a method of forming coiled plastic hose wherein the path extends helically about a substantially horizontal axis and the tube is cooled only in the lower portion of the path.

A further feature of the invention is the provision of such a method of forming coiled plastic hose wherein the plastic is nylon.

Still another feature of the invention is the provision of such a method of forming coiled plastic hose further including the step of continuously extruding the plastic tube to be fed to the forming zone.

Yet another feature of the invention is the provision of such a method of forming coiled plastic hose including the further steps of continuously extruding the plastic tube from a melt, cooling the extruded tube to below the annealing temperature thereof, and heating the cooled tube to the annealing temperature for delivery to the forming zone.

Another feature of the invention is the provision of such a method of forming coiled plastic hose wherein the tube is drawn into the guided helical path.

Still another feature of the invention is the provision of such a method of forming coiled plastic hose wherein the cooling is effected by contacting the coiled hose with a cooling liquid.

A further feature of the invention is the provision of such a method of forming coiled plastic hose wherein cooling is effected by contacting the coiled hose with a cooling liquid at spaced intervals along the helical path.

Another feature of the invention is the provision of such a method of forming coiled plastic hose wherein the set hose is supported on parallel, rotatable rollers and is rotated thereon about its helical axis.

A further feature of the invention is the provision of such a method of forming coiled plastic hose wherein the tube is introduced into the helical path at one end thereof substantially tangentially thereto.

Another feature of the invention is the provision of such a method of forming coiled plastic hose wherein the tube is fed at a rate of at least approximately 30' per minute.

Still another feature of the invention is the provision of such a method of forming coiled plastic hose wherein the helical path is preselected to have the turns of the coiled tube contact each other.

Yet another feature of the invention is the provision of such a method of forming coiled plastic hose further including the step of guiding the tube as it leaves the helical path into axially spaced relationship with the last turn of the tube in the path thereby to impart a slight spacing of the turns in the final coiled helical configuration.

Other features and advantages of the invention will be apparent from the following description taken in connection with the accompanying drawings wherein:

FIGURE 1 is an elevation of an apparatus for continuously forming coiled plastic hose in accordance with the invention;

FIGURE 2 is a vertical elevation of the helical guide means thereof;

FIGURE 3 is a vertical section taken substantially along the line 3—3 of FIGURE 2;

FIGURE 4 is a fragmentary vertical section taken substantially along the line 4—4 of FIGURE 2;

FIGURE 5 is a fragmentary horizontal section taken substantially along the line 5—5 of FIGURE 2; and FIGURE 6 is a fragmentary vertical section taken substantially along the line 6—6 of FIGURE 5.

In the exemplary embodiment of the invention as disclosed in the drawings, a method of continuously forming coiled plastic hose is shown to comprise the steps of continuously feeding a plastic tube 10 to a forming zone generally designated 11, with the temperature of the tube at the time of delivery to the forming zone being at least the annealing temperature thereof. The tube is guided in the forming zone in a helical path and is cooled while in the guided path commencing at a first point generally designated 12 spaced from the beginning point generally designated 13 of the path sufficiently to cause the tube to have a helical configuration prior to the initiation of cooling thereof. The cooling is continued to a second point 14 whereat the tube is sufficiently cooled to be effectively set in the helical configuration. The helical tube is then delivered to a support means generally designated 15 which retains the coiled tube in the helical configuration for a preselected time to complete the forming of the tube as a helically coiled plastic hose.

More specifically, as shown in FIGURE 1, the tube 10 may comprise a tube formed of a thermoplastic material, such as nylon 11 (11-amino undecanoic acid), and may be provided continuously from a suitable melt as by means of a conventional extruder 16. The plastic thusly may be extruded at a temperature of approximately 500° F. The extruded tube 10 may be cooled to approximately 200° F. as by passing thereof through a conventional water bath apparatus 17. Tube 10 may be drawn from the cooling apparatus 17 by a suitable haul off apparatus 18, and thence to a conventional heating apparatus 19 for raising the temperature of the tube accurately to the annealing temperature which, illustratively, in the case of nylon may be approximately 300° F. At this temperature, the plastic tube is deformable, and when set by subsequent cooling, will maintain the deformed configuration. Thus, as discussed briefly above, the coiled configuration may be effected by suitably guiding the tube into a helical path corresponding to the desired coiled configuration whereby the deformable plastic will assume the desired helical configuration and permit subsequent cooling thereof to set the tube in the desired configuration.

More specifically, as shown in FIGURES 2 through 5, the hose 10 at the annealing temperature is fed to a plurality of guide rollers generally designated 20 which are arranged to define a helical path generally designated 21 extending about a substantially horizontal axis 22. Each roller comprises a guide portion defined by a plurality of segmentally helical grooves 23 and a shank portion 24 extending coaxially from the guide portion 23 and carrying a suitable drive means such as gear 25 for driving the roller from a suitable power source such as electric motor 26 through a transmission 27 (FIGURE 1). The output shaft 28 of the transmission may be provided with a main drive gear 29 arranged to have driving association with the respective roller gears 25. The shaft 28 may be suitably journalled in bearings 30 and 31 carried in support plates 32 and 33, respectively. The shank portion 24 of each roller 20 may be journalled in suitable sleeve bearings 34 and 35 carried in the plates 32 and 33, respectively. O-rings 36 may be provided on the shank 24 for sealing the shank to the bearings 34 and 35. Each roller 20 further includes an outboard shank portion 37 journalled in a support plate 38, and a suitable O-ring 39 may be provided on shank portion 37 for sealing the shank portion 37 to the plate 38.

The space 40 in which the guide portions 23 of the rollers 20 are disposed between support plates 33 and 38 further defines means for holding a quantity of cooling fluid, such as water W, to have an upper level L at point 12, as shown in FIGURE 4. Thus, the space 40 is further defined by side walls 41 and 42 and a bottom wall 43 which cooperates with the plates 33 and 38 to define the coolant liquid holder. In the illustrated embodiment, the coolant liquid may be tap water which conventionally is at, or somewhat below, the ambient temperature. The coolant water may be delivered into the space 40 through a suitable inlet duct 40a and conducted therefrom through a suitable outlet duct 40b. The coolant water may be continuously flowed through the space to maintain the desired cooling conditions in the forming zone 11. As shown in FIGURE 4, the initial cooling point 12 is spaced from the beginning point 13 of the helical path as determined by the disposition of the first pair of rollers 20a angularly approximately 45°.

Thus, the tube 10 is firstly deformed into the helical path 21 before initiation of the cooling thereof from the annealing temperature to which it was raised in the apparatus 19. The tube 10 then moves downwardly in the helical path 21 through the water W while being guided by the rollers 20 and, thus, maintained in the helical path 21. Approximately 270° beyond point 12, i.e. at point 44, the tube emerges upwardly from the water W at level L, and then is guided back downwardly into the water to make another pass therethrough.

As illustrated in FIGURE 5, the tube is guided downwardly into the cooling water four times in passing through the forming zone 11 so as to lower the temperature thereof to substantially below the annealing temperature, e.g. approximately 150° F. The tube is guided outwardly through the plate 38 by means of a segmentally helical slot 45 therein. As best seen in FIGURE 5, the slot 45 causes the tube 10 to split away from the last turn 46 on the guide rollers 20 and delivers the tube onto a set of support rollers 47 defining the support 15. The rollers 47 are suitably spaced to support the now helically coiled tube in the helical configuration, while allowing the tube to cool further and complete the setting thereof to define the completed formed coiled hose H. The support 47 may be rotatably mounted to facilitate the movement of the coiled tube thereon as it is fed from the forming zone 11, and thereby maintain the tube in the helically coiled configuration wherein the turns 48 thereof are closely juxtaposed.

The apparatus may be arranged to form the coiled hose H continuously at a relatively high rate, such as at least approximately 30 feet per minute, while yet assuring an accurately maintained helically coiled configuration thereof with effectively minimized stresses in the hose material and with maintained circularity of the tube cross section. A suitable number of rollers may be employed for effecting the arrangement of the tube in the helical configuration, and in the illustrated embodiment, eight sets of rollers are provided. Each of the guide portions 23 in the illustrated embodiment is provided with four groove portions which are juxtaposed so that the tube convolutions substantially contact each other in the forming zone. The slot 45, however, provides a slight spacing of the turns in the final coiled hose H.

In the illustrated embodiment, the tube 10 is reheated to the annealing temperature to eliminate any previous set in the tube as delivered from the extruder. Where some deformation of the tube may be allowed, the tube may be delivered directly from the extruder to the forming zone by having the temperature thereof lowered directly to the desired forming temperature.

While I have shown and described one embodiment of my invention, it is to be understood that it is capable of many modifications. Changes, therefore, in the construction and arrangement may be made without departing from the spirit and scope of the invention.

I claim:

1. The method of continuously forming coiled plastic hose, comprising the steps of:

continuously feeding a plastic tube axially to a forming zone; causing the temperature of the tube to be at least the annealing temperature thereof; providing in said forming zone a plurality of helically spaced roller pairs, each defining a tube receiving space therebetween; driving the roller pairs; guiding the tube successively through the respective driven roller pair spaces to follow a helical path in said forming zone; sequentially cooling the tube solely below a preselected level in said guided helical path commencing at a first point spaced from the beginning of the helical path sufficiently to cause the tube to have a helical configuration prior to cooling thereof, and a subsequent point whereat the tube is cooled sufficiently to become set in said helical configuration; and supporting the set hose in a coiled helical configuration for at least a preselected time to complete the forming.

2. The method of forming coiled plastic hose of claim 1 wherein said heated tube is guided along the helical path at least approximately 45° before commencing the cooling step.

3. The method of forming coiled plastic hose of claim 1 wherein said plastic is nylon.

4. The method of forming coiled plastic hose of claim 1 further including the steps of continuously extruding the plastic tube from a melt; cooling the extruded tube to below the annealing temperature thereof; and heating the cooled tube to effect said causing of the temperature of the tube to be at least the annealing temperature thereof for immediate feeding to the forming zone in said feeding step.

5. The method of forming coiled plastic hose of claim 1 wherein the tube is drawn by said roller pairs into said guided helical path.

6. The method of forming coiled plastic hose of claim 1 wherein said cooling is effected by sequentially contacting the coiled hose with a cooling liquid below said level.

7. The method of forming coiled plastic hose of claim 1 wherein said set hose is supported on parallel, rotatable rollers and is rotated thereon about its helical axis by the helical feed of said driven roller pairs.

8. The method of forming coiled plastic hose of claim 1 wherein said feeding means feeds said tube at a rate of at least approximately 30 feet per minute.

9. The method of forming coiled plastic hose of claim 1 wherein said roller pairs guide the tube to have the turns thereof contact each other.

10. The method of forming coiled plastic hose of claim 1 further including the step of guiding the tube as it leaves said helical path into axially spaced relationship with the last turn of the tube in said path thereby to impart a slight spacing of the turns in the final coiled helical configuration.

References Cited

UNITED STATES PATENTS

| | | | |
|---|---|---|---|
| 1,643,999 | 10/1927 | Semple | 264—210 XR |
| 2,450,324 | 9/1948 | Wilson | 18—19 |
| 2,523,015 | 9/1950 | Greiner | 264—281 XR |
| 2,661,499 | 12/1953 | James | 18—47.5 |
| 2,767,432 | 10/1956 | Mooney | 18—14 |

ROBERT F. WHITE, *Primary Examiner.*

R. A. KUCIA, *Assistant Examiner.*

U.S. Cl. X.R.

264—210, 281, 339